US012759567B2

(12) United States Patent
An et al.

(10) Patent No.: US 12,759,567 B2
(45) Date of Patent: Oct. 13, 2026

(54) FAULT MANAGEMENT DEVICE FOR DEVICES IN A MOBILITY DEVICE AND A FAULT MANAGEMENT METHOD THEREOF

(71) Applicant: HYUNDAI AUTOEVER CORP., Seoul (KR)

(72) Inventors: Sang Do An, Seoul (KR); Kyo Min Kim, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 273 days.

(21) Appl. No.: 18/545,408

(22) Filed: Dec. 19, 2023

(65) Prior Publication Data

US 2024/0217526 A1 Jul. 4, 2024

(30) Foreign Application Priority Data

Dec. 29, 2022 (KR) ........................ 10-2022-0188773

(51) Int. Cl.
*B60W 50/02* (2012.01)

(52) U.S. Cl.
CPC ............................... *B60W 50/0205* (2013.01)

(58) Field of Classification Search
CPC ...... G05B 23/0213; G05B 2219/24065; G05B 23/0235; G05B 23/0272; G07C 5/008; G07C 5/0808; G07C 5/0816
See application file for complete search history.

(56) References Cited

U.S. PATENT DOCUMENTS 5,060,156 A * 10/1991 Vajgart .................. G07C 5/006 701/29.5
5,902,342 A * 5/1999 Mishra ...................... B60L 9/00 318/632
5,912,898 A * 6/1999 Khoury ................ H03M 13/23 714/701

(Continued)

FOREIGN PATENT DOCUMENTS

| | | |
|---|---|---|
| CN | 114393995 A | 4/2022 |
| KR | 100204774 B1 | 6/1999 |

(Continued)

OTHER PUBLICATIONS

Notice of Allowance cited in the corresponding Korean patent application No. 10-2022-0188773; Sep. 25, 2025; 4 pp.

*Primary Examiner* — Fadey S. Jabr
*Assistant Examiner* — Mark Robert Heim
(74) *Attorney, Agent, or Firm* — Lempia Summerfield Katz LLC

(57) ABSTRACT

A method performed by a fault management device including a microcontroller is provided. The method includes receiving fault information from a controller connected to the fault management device. The method also includes incrementing a first counter in response to receiving the fault information. The method additionally includes incrementing a second counter and initializing the first counter, when the first counter exceeds a first reference value. The method further includes incrementing a third counter and initializing the second counter, when the second counter exceeds a second reference value. When the fault management device does not receive the fault information for a first reference time or more, the first counter decrements.

11 Claims, 11 Drawing Sheets

(56) References Cited

U.S. PATENT DOCUMENTS

| | | | | |
|---|---|---|---|---|
| 7,016,778 | B1 * | 3/2006 | Ehmer | B60T 8/175 180/197 |
| 7,239,946 | B2 * | 7/2007 | Sowa | G01M 15/05 701/33.9 |
| 7,644,608 | B2 * | 1/2010 | Mc Lain | F02D 41/2403 73/114.31 |
| 7,984,341 | B2 * | 7/2011 | Wisniewski | G06F 11/0721 370/242 |
| 9,139,205 | B2 * | 9/2015 | Jeong | B60W 20/50 |
| 9,733,952 | B2 * | 8/2017 | Luedeke | G06F 9/44505 |
| 9,868,445 | B2 * | 1/2018 | Mangette | B60W 50/087 |
| 10,838,794 | B2 * | 11/2020 | Hoegberg | G05B 23/0286 |
| 2003/0154762 | A1 * | 8/2003 | Haas | G05B 19/0428 73/1.01 |
| 2009/0100921 | A1 * | 4/2009 | Mc Lain | F02D 41/2403 73/114.31 |
| 2012/0101672 | A1 * | 4/2012 | Wang | B60L 3/12 903/930 |
| 2013/0144473 | A1 | 6/2013 | Jeong et al. | |
| 2014/0350817 | A1 * | 11/2014 | Stein | B60T 8/4872 701/70 |
| 2016/0032812 | A1 * | 2/2016 | Lee | F01N 11/007 73/114.73 |
| 2017/0043787 | A1 * | 2/2017 | Mangette | G05D 1/0223 |
| 2018/0154903 | A1 * | 6/2018 | Song | B60W 60/0059 |
| 2019/0140473 | A1 * | 5/2019 | Peeters | H02J 7/0047 |
| 2020/0023891 | A1 * | 1/2020 | Lin | B62D 5/0484 |
| 2020/0187263 | A1 * | 6/2020 | Shreevastav | H04W 74/0833 |
| 2021/0189985 | A1 * | 6/2021 | Fukuchi | F02D 41/222 |
| 2021/0362778 | A1 * | 11/2021 | Tibori | B62D 5/046 |
| 2022/0149650 | A1 * | 5/2022 | Winger | G01R 31/58 |
| 2022/0232022 | A1 * | 7/2022 | Kumar | B60R 25/30 |
| 2023/0262664 | A1 * | 8/2023 | Mo | H04L 1/1864 370/328 |
| 2025/0289411 | A1 * | 9/2025 | Fernandez Cruz | B60W 10/04 |

FOREIGN PATENT DOCUMENTS

| | | | |
|---|---|---|---|
| KR | 20040022953 | A | 3/2004 |
| KR | 101069637 | B1 | 10/2011 |
| KR | 20120045271 | A | 5/2012 |
| KR | 20130061575 | A | 6/2013 |
| KR | 20220113065 | A | 8/2022 |
| KR | 102452742 | B1 | 10/2022 |

* cited by examiner

FAULT MANAGEMENT DEVICE FOR DEVICES IN A MOBILITY DEVICE AND A FAULT MANAGEMENT METHOD THEREOF

CROSS-REFERENCE TO RELATED APPLICATION

This application claims the benefit of and priority to Korean Patent Application No. 10-2022-0188773, filed on Dec. 29, 2022, the entire contents of which are incorporated herein by reference.

TECHNICAL FIELD

The present disclosure relates to a fault management device and method that provides several fault management tools.

BACKGROUND

As technology develops, the number of mechanical devices (e.g., mechatronics) that combine machines and information devices is currently increasing in various mobility technologies. A typical mobility device (e.g., a vehicle or other moving object) includes numerous electronic control units that control numerous parts within the mobility device.

To effectively control the functions of numerous parts in the mobility device, it is necessary to detect a fault of each part and effectively manage the fault of the parts when the fault occurs. When managing a fault, it is common to first recognize the severity of the fault. Accordingly, it is necessary to determine whether the mobility device may perform an original purpose despite the fault of the parts.

However, in order to recognize the severity of the fault, the severity of the fault was previously inferred by counting only the number of occurrences of the fault. The parts in the mobility device may have different contributions to performing the original purpose of the mobility device. However, the severity of the fault was inferred by uniformly counting only the number of occurrences of the fault without considering different contributions of the parts.

Accordingly, if minor faults frequently occur in parts that do not prevent the mobility device from performing its original purpose, the performance of the mobility device itself may be interrupted because a fault management device determines that the severity of the fault is high based on the number of occurrences of the fault. This means that the fault management device inefficiently performs fault management on the parts in the mobility device.

In addition, if the frequency of faults in parts that have a critical function in performing the original purpose of the mobility device is low, the performance of the mobility device itself may not be interrupted because the fault management device determines that the severity of the fault is low based on the number of occurrences of the fault. This may cause serious safety problems for users of mobility devices.

SUMMARY

Aspects of the present disclosure provide a fault management device that analyzes fault information and provides a fault management tool for faults of controlled devices based on the fault information of the controlled devices collected by an electronic control device in a mobility device.

Aspects of the present disclosure provide a method for managing faults using individual counter sets according to the cause or type of the faults of a controlled device in a fault management device providing a fault management tool.

Aspects of the present disclosure provide a method for managing faults using individual counters according to the cause or type of the faults of a controlled device in a fault management device providing a fault management tool.

However, aspects of the present disclosure are not limited to those set forth herein. The above and other aspects of the present disclosure should become more apparent to one of ordinary skill in the art to which the present disclosure pertains by referencing the detailed description of the present disclosure given below.

According to an embodiment, a method performed by a fault management device including a microcontroller is provided. The method may include receiving fault information from a controller connected to the fault management device. The method may also include incrementing a first counter in response to receiving the fault information. The method may additionally include incrementing a second counter and initializing the first counter, when the first counter exceeds a first reference value. The method may further include incrementing a third counter and initializing the second counter, when the second counter exceeds a second reference value. When the fault management device does not receive the fault information for a first reference time or more, the first counter may decrement.

In some embodiments, the first reference value and the second reference value are arbitrarily set by a user, or are linked to the fault information and have individually fixed values in each counter.

In some embodiments, the first reference time is arbitrarily set by a user, or is linked to the fault information and has a fixed value in the first counter.

According to another embodiment, a method performed by a fault management device including a microcontroller is provided. The method may include receiving information indicating an occurrence of a pre-designated first fault from a controller connected to the fault management device. The method may also include incrementing a first counter of a first counter set corresponding to the first fault, the first counter set including a first number of counters. The method may additionally include receiving information indicating an occurrence of a pre-designated second fault from the controller connected to the fault management device. The method may further include incrementing a second counter of a second counter set corresponding to the second fault, the second counter set including a second number of counters. The first number and the second number may be different. The first counter set and the second counter set may include one or more counters. When at least one of the first counter set and the second counter set includes a plurality of counters, the plurality of counters includes the first counter and the second counter. The second counter is incremented when the first counter exceeds a first reference value.

In some embodiments, when at least one of the first counter set and the second counter set includes a third counter, the counter set including the third counter includes first to third counters. The second counter is incremented when the first counter exceeds the first reference value. The third counter is incremented when the second counter exceeds a second reference value.

In some embodiments, the method may further include entering a safe mode when the third counter exceeds the third reference value. The safe mode may be a mode in which a mobility device operates with some devices of the mobility device including the fault management device deactivated.

In some embodiments, the method may further includes decrementing the first counter when information indicating an occurrence of any one fault of a plurality of faults including the first fault is not received for a first reference time or more.

According to still another embodiment, a method performed by a fault management device including a microcontroller is provided. The method may include receiving information indicating an occurrence of a pre-designated first fault from a controller connected to the fault management device. The method may also include determining a counter to be incremented corresponding to the first fault as any one of a first counter, a second counter, and a third counter. The method may additionally include incrementing the counter to be incremented. The second counter may be a counter that is incremented when the first counter exceeds a first reference value as a result of the increment of the first counter. The third counter may be a counter that is incremented when the second counter exceeds a second reference value as a result of the increment of the second counter.

In some embodiments, the method may further include receiving information indicating an occurrence of a pre-designated second fault from a controller connected to the fault management device. The method may further include incrementing the first counter in response to receiving the information indicating the occurrence of the second fault. The method may additionally include incrementing the second counter and initializing the first counter, when the first counter exceeds the first reference value. The method may further include incrementing the third counter and initializing the second counter, when the second counter exceeds the second reference value. The first fault and the second fault may be different faults.

In some embodiments, the method may further include decrementing the first counter when information indicating an occurrence of any one fault of a plurality of faults including the first fault is not received for a first reference time or more.

In some embodiments, incrementing the counter to be incremented may include entering a safe mode in response to the third counter exceeding a third threshold as a result of the increment of the counter to be incremented. The safe mode may be a mode in which a mobility device operates with some devices of the mobility device including the fault management device deactivated.

According to another embodiment, a fault management device is provided. The fault management device comprises a processor and a memory for storing instructions. The instructions, when executed by the processor, cause the processor to perform operations. The operations include receiving fault information from a controller connected to the fault management device. The operations also include incrementing a first counter in response to receiving the fault information. The operations additionally include incrementing a second counter and initializing the first counter, when the first counter exceeds a first reference value. The operations further include incrementing a third counter and initializing the second counter, when the second counter exceeds a second reference value. When the fault management device does not receive the fault information for a first reference time or more, the first counter decrements.

In some embodiments, the first reference value and the second reference value are arbitrarily set by a user, or are linked to the fault information and have individually fixed values in each counter.

In some embodiments, the first reference time is arbitrarily set by a user, or is linked to the fault information and has a fixed value in the first counter.

BRIEF DESCRIPTION OF THE DRAWINGS

The above and other aspects and features of the present disclosure should become more apparent from the following description, with reference to the accompanying drawings, in which.

DETAILED DESCRIPTION

Figure 1:
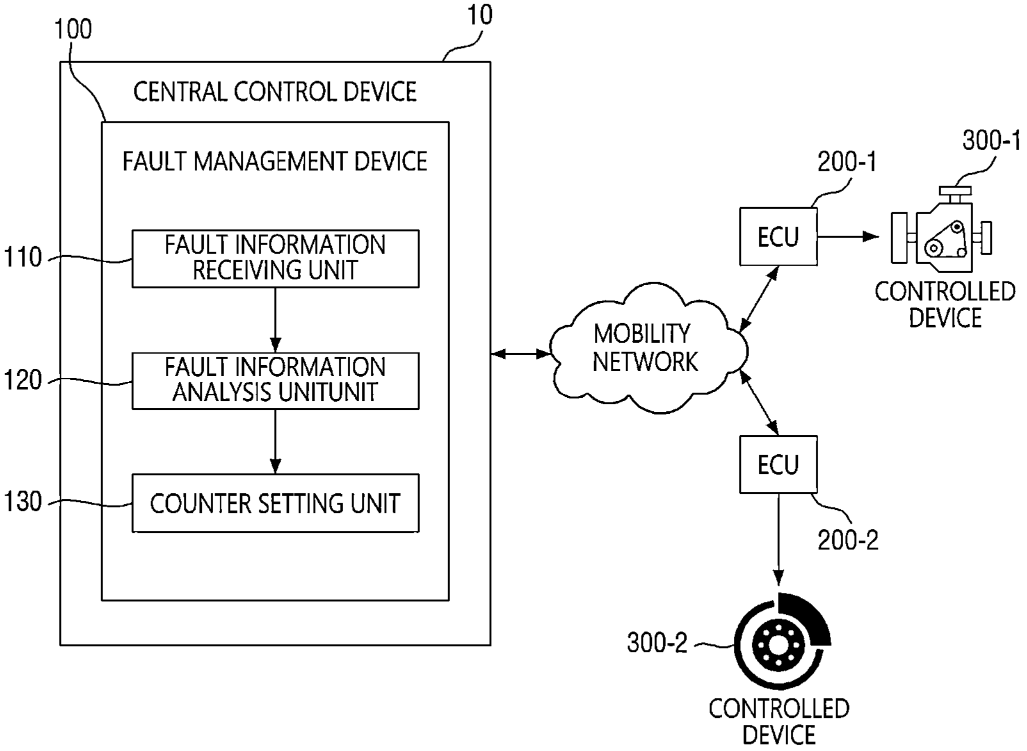
FIG. 1 is a view for schematically describing a mechanism in which a fault management device according to an embodiment of the present disclosure receives fault information from electronic control units and analyzes the received fault information to manage a fault of a controlled device.

Hereinafter, embodiments of the present disclosure are described with reference to the accompanying drawings. Advantages and features of the present disclosure and methods of accomplishing the same should be more readily understood by those having ordinary skill in the art from the following detailed description of embodiments and the accompanying drawings. The present disclosure may, however, be embodied in many different forms and should not be construed as being limited to the embodiments set forth herein. Rather, these embodiments are provided so that this disclosure is thorough and complete and fully conveys the concepts of the disclosure to those having ordinary skill in the art. The scope of the present disclosure is defined by the appended claims.

In adding reference numerals to the components of each drawing, it should be noted that the same reference numerals are assigned to the same components as much as possible even when the components are shown in different drawings. In addition, in describing the present disclosure, when it was determined that a detailed description of the related well-known configuration or function may obscure the gist of the present disclosure, the detailed description thereof has been omitted.

Unless otherwise defined, all terms used in the present specification (including technical and scientific terms) may be used in a sense that can be commonly understood by those having ordinary skill in the art to which this disclosure pertains. In addition, the terms defined in the commonly used dictionaries should not be ideally or excessively interpreted unless they are clearly defined in the present disclosure. The terminology used herein is for the purpose of describing particular embodiments only and is not intended to be limiting of the disclosure. In this specification, the singular also includes the plural unless specifically stated otherwise in the phrase.

In addition, in describing the components of the present disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with the other component, but it should be understood that another component may also be "connected," "coupled" or "contacted" between the components.

The terms "comprise", "include", "have", etc., when used in this specification, specify the presence of stated features, integers, steps, operations, elements, components, and/or combinations of them but do not preclude the presence or addition of one or more other features, integers, steps, operations, elements, components, and/or combinations thereof.

When a component, device, element, or the like of the present disclosure is described as having a purpose or performing an operation, function, or the like, the component, device, or element should be considered herein as being "configured to" meet that purpose or to perform that operation or function.

As used herein, "mobility device" may refer to any type of vehicle or other moving object to which the technical ideas of the present disclosure may be applied.

Hereinafter, embodiments of the present disclosure are described with reference to the accompanying drawings.

FIG. 1 is a view for schematically describing a mechanism in which a fault management device 100 according to an embodiment of the present disclosure receives fault information from electronic control units 200 and analyzes the received fault information to manage a fault of a controlled device 300.

According to an embodiment, a central control device 10 may include the fault management device 100. The fault management device 100 may, in turn, include a fault information receiving unit 110, a fault information analysis unit 120, and a counter setting unit 130. The central control device 10 may manage a plurality of processors of electronic control units 200 present within a mobility device. One of the plurality of processors may be a processor through which the electronic control units 200 collect fault information of controlled devices.

The electronic control units 200 may control the controlled device 300 and collect fault information of the controlled device 300. For example, an electronic control unit 200-1 may control a controlled device 300-1 corresponding to an engine, and an electronic control unit 200-2 may control a controlled device 300-2 corresponding to a motor, and may collect fault information of the controlled device 300.

According to an embodiment, the central control device 10 may receive the fault information of the controlled device 300 from the plurality of electronic control units 200 present in the mobility device via a mobility network. For example, the central control device 10 may receive the fault information from the electronic control unit 200 that controls the engine 300-1 or motor 300-2 via the mobility network.

The mobility network may refer to a communication network for all means of transportation that contribute to convenient movement of people, such as taxis, bicycles, electric kickboards, drones, or the like.

According to an embodiment, when the fault information receiving unit 110 in the fault management device 100 receives the fault information of the controlled device 300 from the electronic control unit 200, the fault information analysis unit 120 may analyze the cause of a fault of the controlled device, and may transmit the analysis result to the counter setting unit 130 in the fault management device.

The counter setting unit 130 may implement an algorithm for counter setting corresponding to the fault analysis result received from the fault information analysis unit 120. The algorithm for counter setting may include determining a counter set determination and a counter order according to the cause of the fault.

Figure 2:
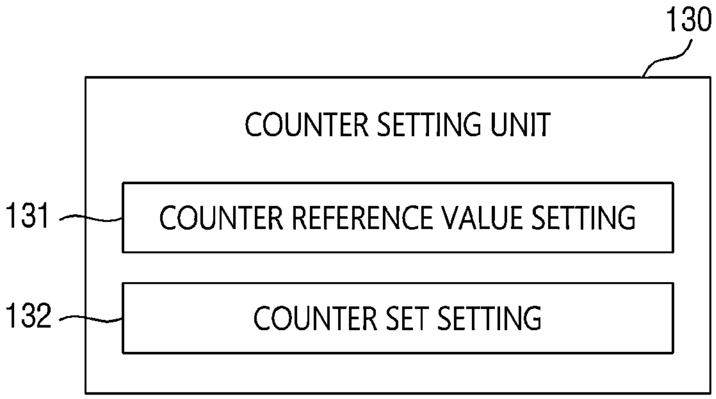
FIG. 2 is a configuration view of a counter setting unit in the fault management device described with reference to FIG. 1.

FIG. 2 is a block diagram of a counter setting unit, according to an embodiment of the present disclosure.

According an embodiment, the counter setting unit 130 may include a counter reference value setting module 131. In some embodiments of the present disclosure, the fault management device may manage faults of the controlled device using first to third counters. In an example, each counter has an individual counter reference value. The user may arbitrarily set the counter reference value, or the counter reference value may be linked to the fault information and have an individually fixed counter reference value for each counter.

For example, if the user arbitrarily sets a first reference value of the first counter to 10 and a second reference value of the second counter to 5, the second counter may be performed when the first counter exceeds the first reference value of 10, and the third counter may be performed when the second counter exceeds the second reference value of 5. If the user differently sets the counter reference value depending on the type and cause of the fault, the fault management device may manage faults of the controlled devices by differentiating multiple faults. The counter reference value setting module 131 according to the an embodiment is described in more detail below.

In addition, according to an embodiment, the counter setting unit 130 may include a counter set setting module 132. The counter set setting module 132 has a first counter set corresponding to a first fault and a second counter set corresponding to a second fault. The first counter set may include a first number of counters and the second counter set may include a second number of counters. In an example, the first number and the second number are different. For example, when the first number is 1 and the second number is 2, the second counter set may include a first counter and a second counter.

In a method for managing a fault of a controlled device using a counter set among some embodiments of the present disclosure, the user may arbitrarily set the counter set by the counter set setting module 132, or the counter set may be linked to fault information and have a fixed counter set corresponding to the fault.

For example, when a fault occurs in an external chip that monitors malfunction of a microcontroller outside the microcontroller within the fault management device (first fault), the fault management device may manage the fault with only the first counter using a counter set that includes only one counter. On the other hand, when a fault occurs in a core within the fault management device and the mobility device may not perform an original purpose (second fault), the fault management device may manage the fault of the controlled device using a counter set including the first to third counters.

Figure 3:
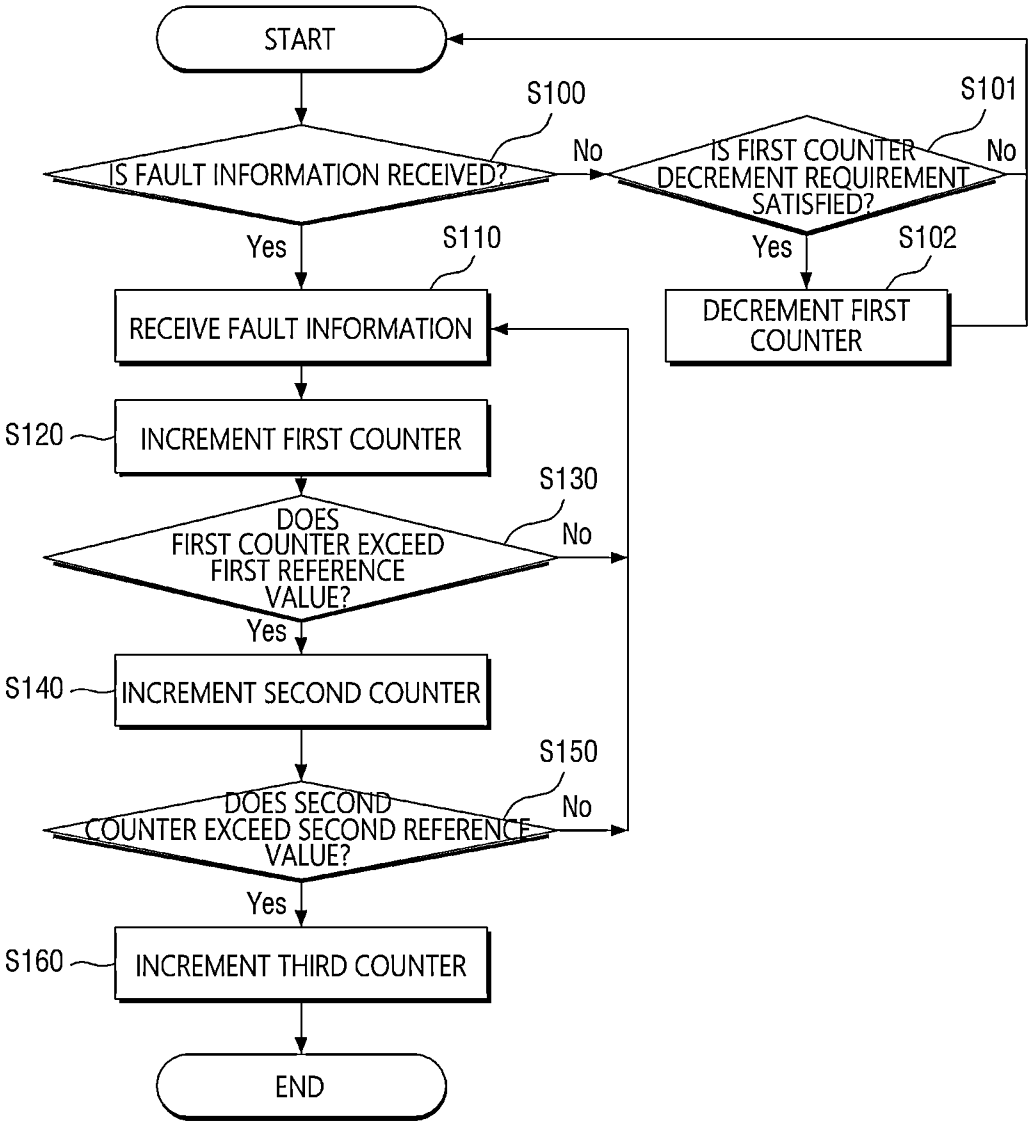
FIG. 3 is a flowchart of a fault management method using a fault management device, according to another embodiment of the present disclosure.

FIG. 3 is a flowchart of a fault management method using a fault management device, according to an embodiment of the present disclosure.

In a step or operation S100, it is determined whether the fault management device receives fault information of the controlled device from the electronic control units in the mobility device. If the fault management device does not receive the fault information from the electronic control units, the fault information receiving unit in the fault management device may determine, in a step or operation S101, whether a first counter decrement requirement is satisfied.

The first counter decrement requirement means that when the fault information receiving unit in the fault management device does not receive the fault information of the controlled device from the electronic control units for a first reference time or more, the first counter of the fault management device is decremented in a step or operation S102. In an example, the first reference time may be arbitrarily set by the user.

For example, assuming that the user sets the first reference time to 10 seconds, if the fault information receiving unit does not receive the fault information of the controlled device from the electronic control units for 10 seconds or more, the first counter of the fault management device is decremented. According to some embodiments of the present disclosure, the second counter and third counter may be performed when the first counter exceeds the first reference value. In this case, since the second counter and third counter, unlike the first counter, may be considered to be more exposed to fault of the controlled device, the second counter and third counter are not decremented even if the fault does not occur for the first reference time or more in the future.

However, since the first counter may be sensitive to even minor faults unlike the second counter and third counter, the first counter in the fault management device may be decremented when the fault information receiving unit does not receive the fault information of the controlled device from the electronic control units for the first reference time.

According to an embodiment, since the fault management unit may not react other than decrement in the first counter for minor or weak fault levels, traffic between the central control unit and the electronic control unit may be reduced, and the fault management device may efficiently manage faults for the controlled device.

In a step or operation S110, the fault information receiving unit in the fault management device may receive the fault information of the controlled device from the electronic control unit. In addition, in a step or operation S120, the fault management device may increment the first counter in response to the fault information receiving unit receiving the fault information. If the fault information receiving unit receives the fault information of the controlled device before the first counter exceeds the first reference value set by the user, the fault management device may immediately increment the first counter in response to the fault information receiving unit receiving the fault information in a step or operation S130.

In the step or operation S130, if the first counter in the fault management device increments and exceeds the first reference value of the first counter arbitrarily set by the user, the second counter are performed and the first counter is initialized in a step or operation S140.

For example, assuming that the first reference value of the first counter is 10 times, if the first counter exceeds 10 times, the second counter is incremented by 1 time. In addition, the first counter is initialized. The first counter is incremented to the first reference value in response to the fault information receiving unit receiving the fault information of the controlled device. If the first counter again exceeds the first reference value of 10 times, the second counter is incremented by 1 time, making a total of 2 times.

In a step or operation S150, if the second counter in the fault management device increments and exceeds the second reference value of the second counter arbitrarily set by the user, the third counter is performed and the second counter is initialized in a step or operation S160.

For example, assuming that the first reference value of the first counter is 10 times and the second reference value of the second counter is 5 times, if the first counter exceeds 10 times, the second counter is incremented by 1 time. In addition, the first counter is initialized. The first counter is incremented to the first reference value in response to the fault information receiving unit receiving the fault information of the controlled device. If the first counter again exceeds the first reference value of 10 times, the second counter is incremented by 1 time, making a total of 2 times. In addition, if the second counter exceeds the second reference value of 5 times, the third counter is incremented by 1 time, and the second counter is initialized.

The first to third counters may operate as in the examples, and only the first counter may be decremented when the fault information receiving unit does not receive the fault information for the first reference time as described above. This allows only the first counter to react to a fault of a low frequency level, allowing the fault management device to easily and accurately manage the fault of the controlled device.

Figure 4:
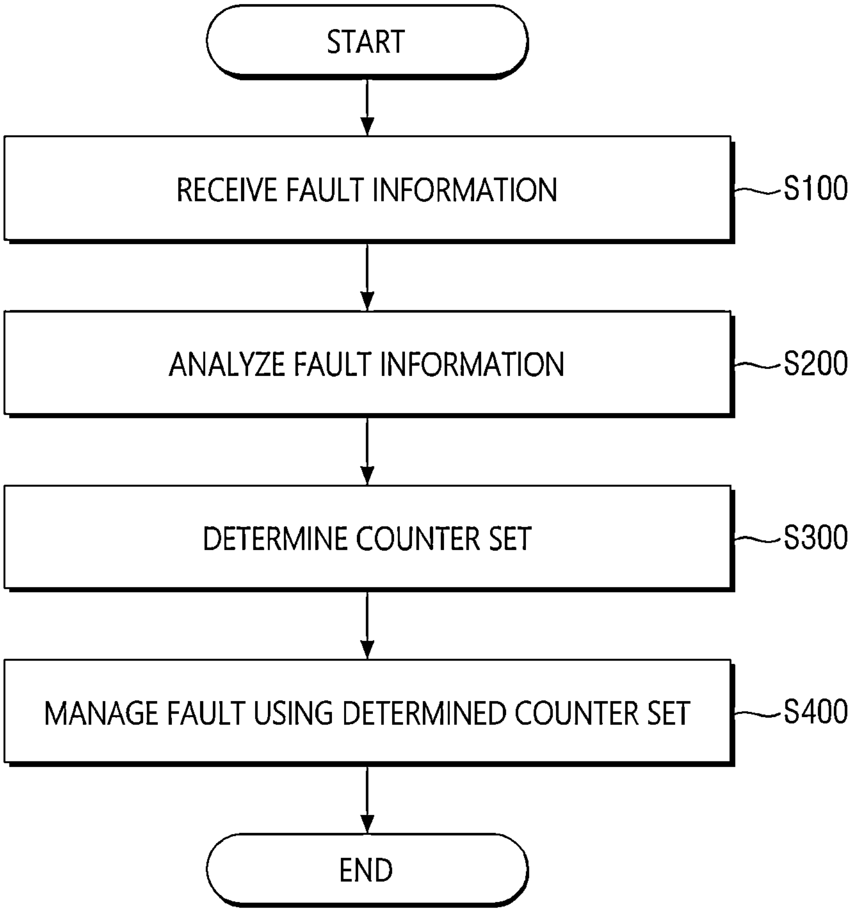
FIG. 4 is a flowchart of a fault management method using a fault management device, according to still another embodiment of the present disclosure.

FIG. 4 is a flowchart of a fault management method using a fault management device, according to another embodiment of the present disclosure.

In a step or operation S100, the fault information receiving unit in the fault management device may receive the fault information of the controlled device from the electronic control unit/In a step or operation S200, the fault information analysis unit in the fault management device may analyze the type and cause of the fault of the controlled device based on the fault information of the controlled device.

In a step or operation S300, the counter setting unit in the fault management device may determine a counter set corresponding to a result based on the result of the fault of the controlled device analyzed by the fault information analysis unit. In a step or operation S400, the fault management device may manage the fault of the controlled device using the counter set determined by the counter setting unit.

Figure 5:
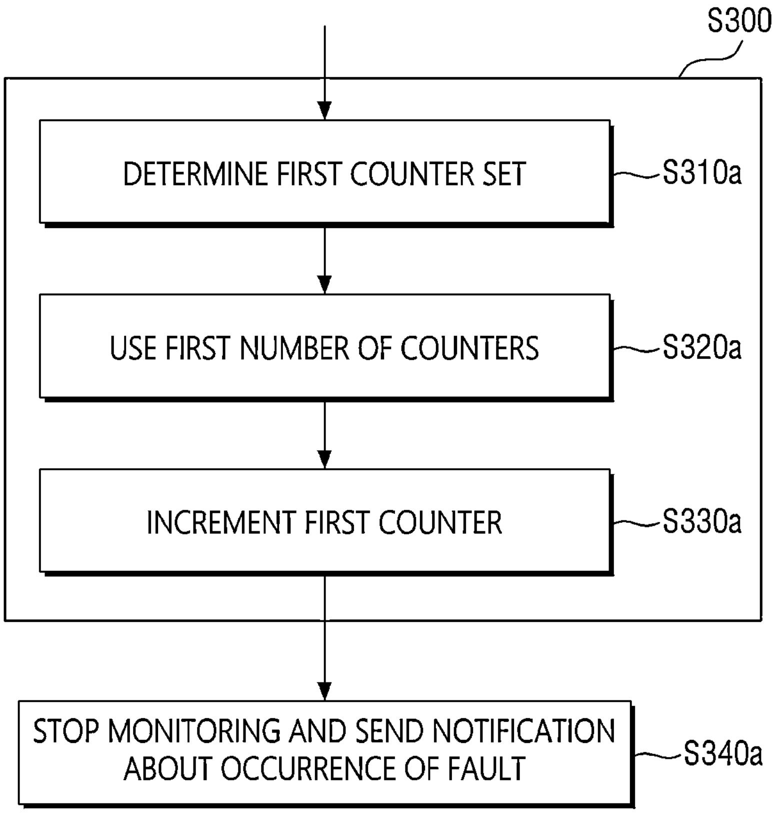
FIGS. 5-7 are detailed flowcharts for describing in detail some operations of the fault management method using the fault management device described with reference to FIG. 4.
Figure 6:
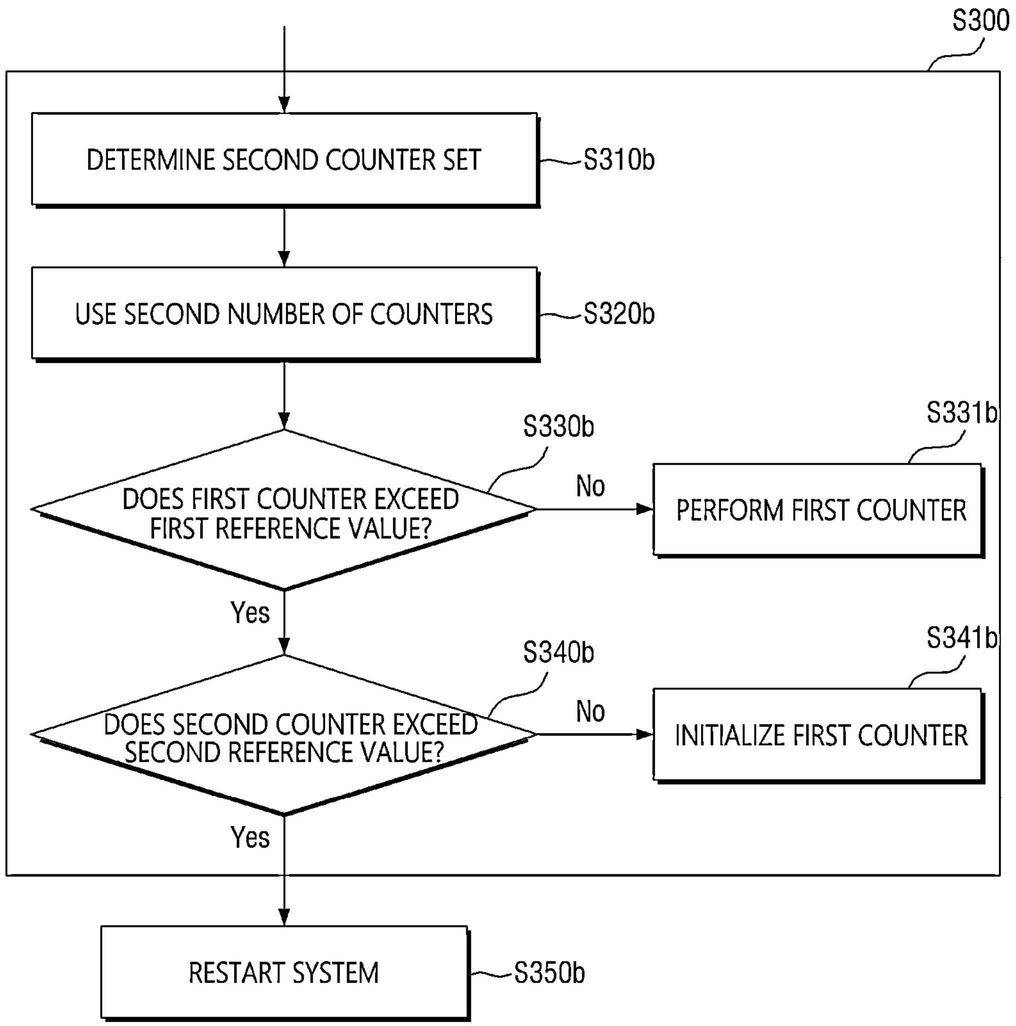
Figure 7:
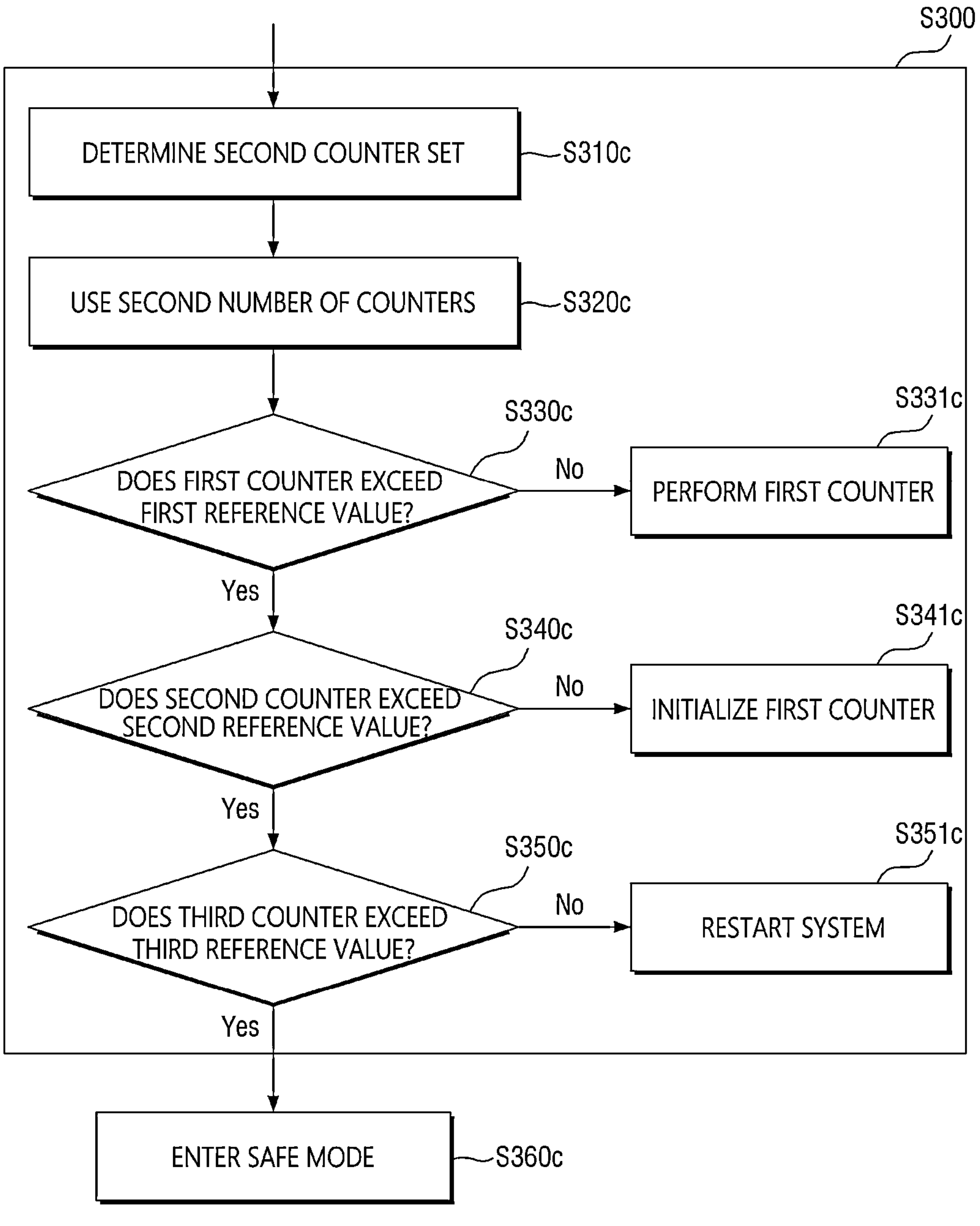

FIGS. 5-7 are detailed flowcharts for describing in detail some operations of the fault management method using the fault management device described with reference to FIG. 4. According to some embodiments of the present disclosure, the fault management device may determine the counter set depending on the type or cause of the fault of the controlled device. For example, the user may arbitrarily set a counter set for each type of fault, or the counter set may be linked to the fault information of the controlled device and set as a fixed counter by the fault management device.

Before describing FIGS. 5-7 in detail, it is noted that the counter set according to some embodiments of the present disclosure may include a first counter set having a first number of counters corresponding to a first fault, and a second counter set having a second number of counters corresponding to a second fault. In addition, the first number of the first counter set and the second number of the second counter set may be different, but for convenience of explanation, it is assumed that the first number is 1 and the second number is 2 or 3, as described in detail in below with reference to later drawings.

Referring now to FIG. 5, in a step or operation S310*a*, the counter set setting module in the fault management device may determine a first counter set as fault management for the fault of the controlled device. In addition, the first counter set is a counter set in which a first number of counters exist, and since the first number has one counter as described above, only the first counter may be performed in this embodiment in a step or operation S320*a*.

According to an embodiment, if the fault management device does not receive the fault information of the controlled device from the electronic control device for the first reference time or more, the first counter may be decremented (not illustrated), and if the fault management device receives the fault information within the first reference time, the first counter is incremented in a step or operation S330*a*.

In addition, the first counter set according to an embodiment may be used by the fault management device when there is no problem in performing the original purpose of the mobility device (fault 1) because severity of the fault is low despite the fault of the controlled device. If the severity of the fault is low, the fault management device does not need to restart the system. Accordingly, in an operation S340*a*, the fault management device stops monitoring the fault of the controlled device in which the fault has already occurred, and sends a notification about the occurrence of the fault to the user.

For example, when the microcontroller in the fault management device does not operate normally, the abnormal operation of the microcontroller may be monitored by a chip outside the microcontroller. The chip outside the microcontroller may not be considered as an essential element for achieving the original purpose of the mobility device. Therefore, for the fault (fault 1) related to the chip outside the microcontroller, the user may set the counter set setting module to use the first counter set for the fault. Then, f the fault management device receives the fault information within the first reference time, the first counter in the fault management device is incremented. If the first counter exceeds the first reference value, the fault management device may stop fault monitoring for the fault, and may send a notification of fault occurrence to the user.

Referring to FIG. 6, in a step or operation S310*b*, the counter set setting module in the fault management device may determine a second counter set as fault management for the fault of the controlled device. In addition, the second counter set is a counter set in which the first counter and the second counter exist, and the fault management device may manage the fault of the controlled device using the first counter and the second counter in a step or operation S320*b*.

In addition, the second counter set according to this embodiment may be used when the severity of the fault is not high (fault 2) so that mobility device may perform the original purpose despite the fault of the controlled device. In this case, the fault management device may perform a system restart through soft reset, and may perform fault management on the controlled device again.

According to an embodiment, if the fault management device does not receive the fault information of the controlled device from the electronic control device for the first reference time or more, the first counter may be decremented (not illustrated). On the other hand, if the fault management device receives the fault information within the first reference time, the first counter is incremented.

If the first counter in the fault management device exceeds the first reference value, the second counter is performed in a step or operation S340*b*. On the other hand, if the first counter does not exceed the first reference value, the second counter is not performed and the fault management device may perform fault management on the controlled device using only the first counter in a step or operation S331*b*.

In addition, if the first counter exceeds the first reference value and the second counter is performed, but the second counter does not exceed the second reference value in the step or operation S340*b*, the first counter is initialized in a step or operation S341*b* and may be performed until the first counter exceeds the first reference value again. In addition, if the second counter exceeds the second reference value, the fault management device may perform fault management on the controlled device through the system restart in a step or operation S350*b*.

For example, if the fault (fault 2) occurs due to a minor system error within the fault management device, but the severity of the fault is not high for the mobility device to perform the original purpose, the user may set the counter set setting module to use the second counter set for the system error fault.

In addition, if the fault management device receives the system error fault information within the first reference time, the first counter in the fault management device is incremented. If the first counter exceeds the first reference value, the second counter may be performed, and if the second counter exceeds the second reference value, the fault management device may perform fault management on the fault of the controlled device through the system restart.

Referring now to FIG. 7, in a step or operation S310*c*, a second counter set may be determined as fault management for the fault of the controlled device by the counter set setting module in the fault management device. In addition, the second counter set is a counter set in which the first to third counters exist, and the fault management device may perform the fault management for the controlled device using the first to third counters in a step or operation S320*c*.

In addition, the second counter set according to this embodiment may be used when the mobility device has difficulty in performing the original purpose due to the fault of the controlled device (fault 2). In this case, the fault management device may perform a system restart through soft reset or enter a safe mode to perform the fault management for the fault of the controlled device, as the fault management for the fault.

The safe mode according to some embodiments of the present disclosure is a mode in which the mobility device operates with some functions deactivated in the functions individually performed by numerous controlled devices within the mobility device, when it is difficult for mobility device to perform the original purpose due to the high severity of the fault of the controlled device.

When performing the safe mode according to an embodiment, the functions that are deactivated may vary depending on the role and importance that the controlled device performs within the mobility device. For example, despite the fact that a serious fault occurred due to a fault of an engine within the mobility device, which prevented the mobility device from being performed at all, if all functions of the engine are activated and the mobility device is operated, it may cause a safety risk for the user of the mobility device.

On the other hand, all functions of the controlled devices are deactivated even if a minor fault occurs in the functions of some of the controlled devices in the mobility device, this may reduce fault management efficiency of the fault management device due to excessive protection.

Even in the first counter according to the present embodiment, if the fault management device does not receive the fault information of the controlled device from the electronic control device for the first reference time or more, the first counter may be decremented (not illustrated), and if the fault management device receives the fault information within the first reference time, the first counter is incremented.

If the first counter in the fault management device exceeds the first reference value, the second counter is performed in a step or operation S330*c*. On the other hand, if the first counter does not exceed the first reference value, the second counter is not performed and the fault management device may perform fault management on the fault of the controlled device using only the first counter in the fault management device in a step or operation S331*c*.

In addition, if the first counter exceeds the first reference value and the second counter is incremented, but the second counter does not exceed the second reference value in a step or operation S340*c*, the first counter is initialized in a step or operation S341*c* and may be performed until the first counter exceeds the first reference value again. Further, if the second counter exceeds the second reference value, the third counter is performed.

In addition, if the second counter exceeds the second reference value and third counter is incremented, but the third counter does not exceed the third reference value in a step or operation S350*c*, the fault management device may manage the fault of the controlled device through the system restart in a step or operation S351*c*. On the other hand, if the third counter exceeds the third reference value, the fault management device may enter the safe mode in a step or operation S360*c*.

For example, if a core fault (fault 2) occurs within the fault management device and the severity of the fault is so high that the mobility device may not perform the original purpose, the user may set the counter set setting module so that the fault management device uses the second counter set for the core fault.

In addition, if the fault management device receives the core fault information within the first reference time, the first counter in the fault management device is incremented. If the first counter exceeds the first reference value, the second counter is executed, and if the second counter exceeds the second reference value, the third counter is performed.

If the third counter does not exceed the third standard value, the fault management device may perform the fault management for the fault of the controlled device through the system restart. On the other hand, if the third counter exceeds the third reference value, the fault management device may enter the safe mode and perform the fault management for the fault of the controlled device.

Figure 8:
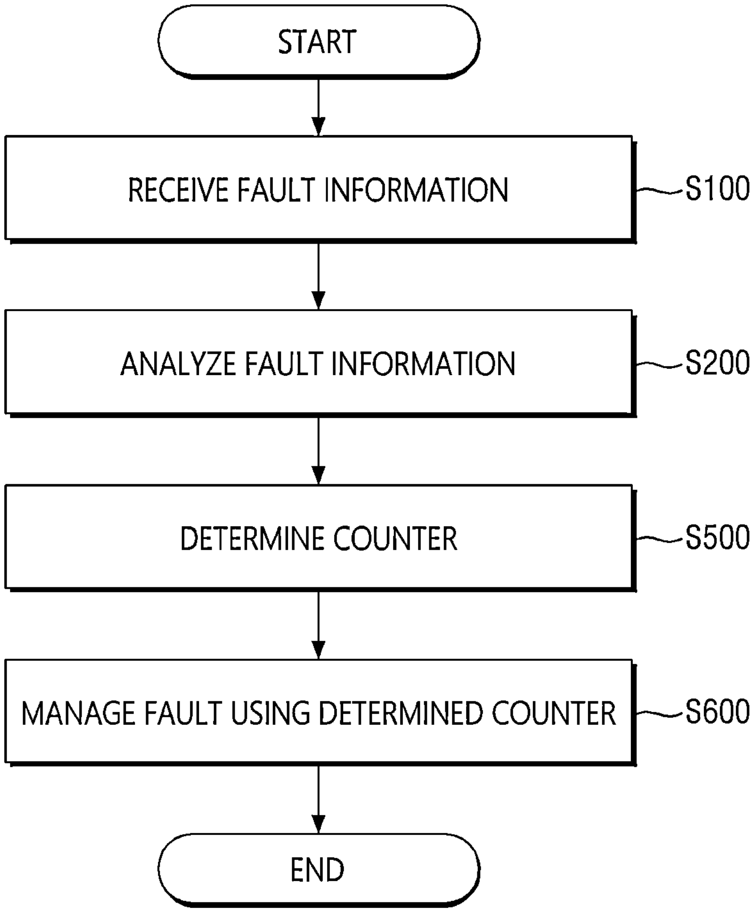
FIG. 8 is a flowchart of a fault management method using a fault management device, according to still another embodiment of the present disclosure.

FIG. 8 is a flowchart of a fault management method using a fault management device, according to still another embodiment of the present disclosure.

According to the present embodiment, in the step or operation S100, the fault information receiving unit in the fault management device may receive the fault information of the controlled device from the electronic control unit. In the step or operation S200, the fault information analysis unit in the fault management device may analyze the type and cause of fault of the controlled device based on the fault information of the controlled device.

In a step S500, the counter setting unit in the fault management device may determine a counter corresponding to a result based on the result of the fault of the controlled device analyzed by the fault information analysis unit. In a step or operation S600, the fault management device may manage the fault of the controlled device using the counter determined by the counter setting unit.

Figure 9:
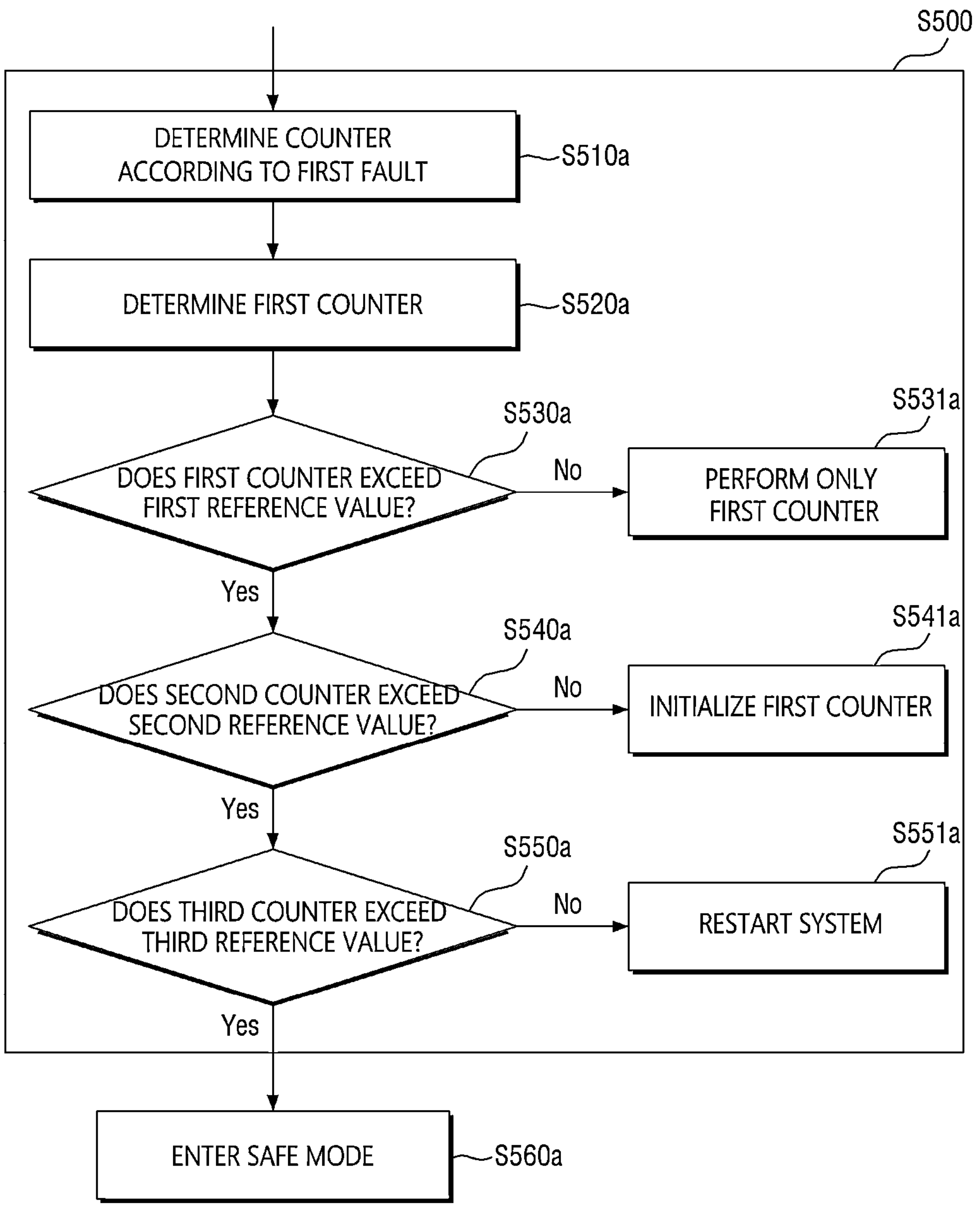
FIGS. 9-11 are detailed flowcharts for describing in detail some operations of the fault management method using the fault management device described with reference to FIG. 8.
Figure 10:
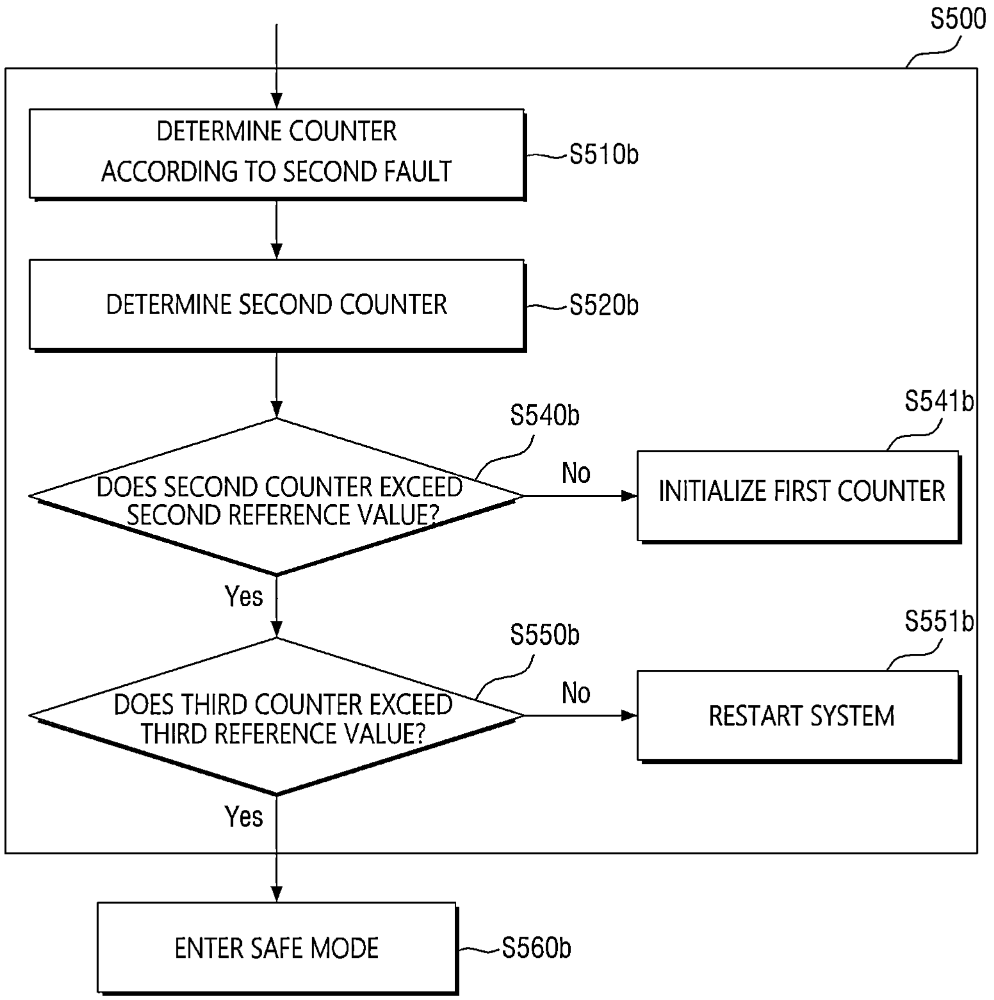
Figure 11:
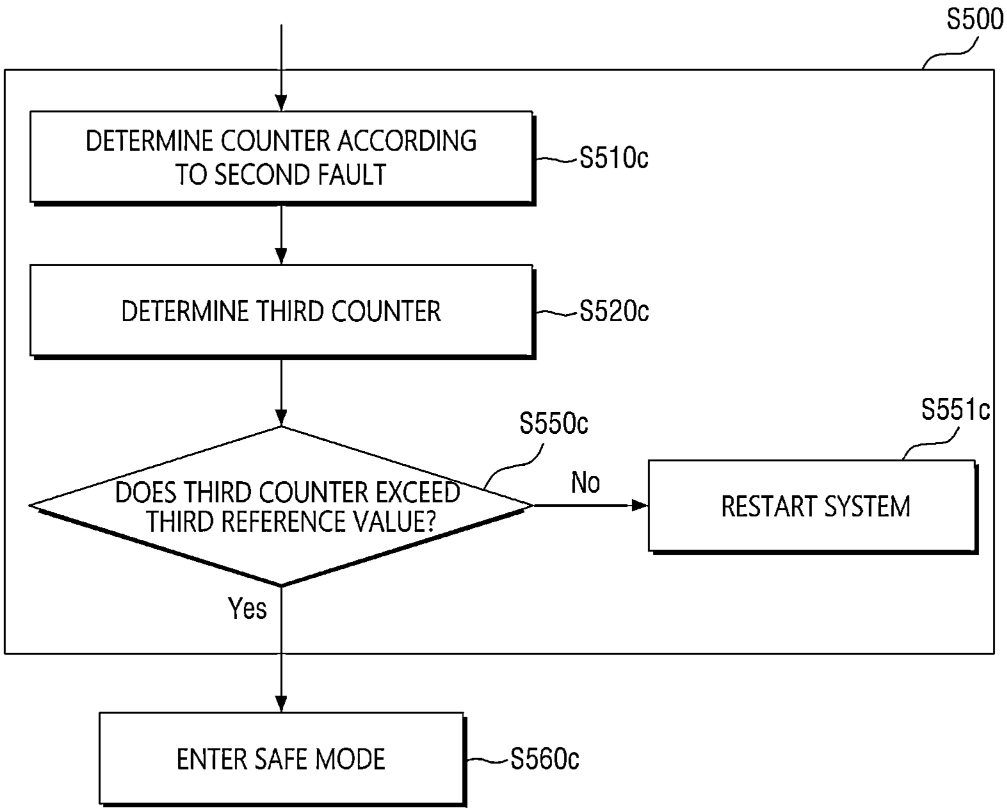

FIGS. 9-11 are detailed flowcharts for describing in detail some operations of the fault management method using the fault management device described with reference to FIG. 8.

According to some embodiments of the present disclosure, the fault management device may determine the counter depending on the type or cause of the fault of the controlled device. The counter may be linked to the fault information of the controlled device and have a fixed counter by the fault management device, and the user may also arbitrarily set the counter for each type of fault or cause of fault.

Specifically, the counter setting unit in the fault management device may determine any one of the first counter to the third counter as a counter to be incremented corresponding to a pre-designated first fault. In addition, the counter setting unit in the fault management device may determine any one of the first counter to the third counter as a counter to be incremented corresponding to a pre-designated second fault. In this case, the first fault and the second fault are different.

The reason for setting a counter corresponding to a fault depending on the type or cause of the fault is to allow the fault management device to immediately perform a safe mode or system restart by using a high counter corresponding to the fault as the severity of the fault is higher and recovery possibility of the fault is lower.

FIG. 9 is a detailed flowchart for a case in which the pre-designated first fault causes the first counter to be determined in FIG. 8.

If the counter according to the pre-designated first fault is determined as the first counter in a step or operation S510*a*, the first counter according to the first fault is determined by the fault management device in a step or operation S520*a*. As described above, in some embodiments, if the fault information receiving unit does not receive the fault information of the controlled device from the electronic control unit within the first reference time, the first counter may be decremented. However, if the fault information receiving unit in the fault management device receives the fault information of the controlled device within the first reference time without exceeding the first reference time from the electronic control unit, the first counter may be incremented.

If the first counter does not exceed the first reference value arbitrarily set by the user, the first counter continues to be performed in a step or operation S531*a*. On the other hand, if the first counter exceeds the first reference value in a step or operation S530*a*, the second counter is performed and the first counter is initialized in a step or operation S541*a*. In addition, if the second counter exceeds the second reference value (in a step or operation 540*a*, the third counter is performed, and the fault management device performs a system restart in a step or operation S551*a*. Further, if the third counter exceeds the third reference value in a step or operation S550*a*, the fault management device enters the safe mode in a step or operation S560*a* and performs fault management for the fault of the controlled device.

For example, if a serious defect may occur in performing the original purpose of the mobility device, such as modulation in register setting values (first fault), but the fault may be recovered by simply restarting the system, the fault management device may perform the same mechanism as performing the fault management by determining the first counter performed in the present embodiment.

FIG. 10 is a detailed flowchart for a case in which the pre-designated second fault causes the second counter to be determined in FIG. 8.

If the counter according to the pre-designated second fault is determined as the second counter in a step or operation S520*b*, the second counter according to the second fault is determined by the fault management device in a step or operation S510*b*.

If the second counter does not exceed the second reference value arbitrarily set by the user in a step or operation S540*b*, the second counter continues to be performed and the first counter are initialized in a step or operation S541*b*. In addition, if the second counter exceeds the second reference value, the third counter is performed, and the fault management device performs a system restart in a step or operation S551*b*. Further, if the third counter exceeds the third reference value in a step or operation S550*b*, the fault management device enters the safe mode in a step or operation S560*b* and performs fault management for the fault of the controlled device.

For example, if a serious defect occurs in the controlled device, and the fault information analysis unit in the fault management device determines that the serious defect is not at a level at which the fault management device may use the first counter, the fault management device may perform the same mechanism as performing the fault management by determining the second counter performed in the present embodiment.

FIG. 11 is a detailed flowchart for a case in which the pre-designated second fault causes the third counter to be determined in FIG. 8.

If the counter according to the pre-designated second fault is determined as the third counter in a step or operation S520*c*, the third counter according to the second fault is determined by the fault management device in a step or operation S510*c*.

If the third counter does not exceed the third reference value arbitrarily set by the user in a step or operation S550*c*, the fault management device performs a system restart in a step or operation S551*c*. On the other hand, if the third counter exceeds the third reference value in the step or operation S550*c*, the fault management device enters the safe mode in a step or operation S560*c* and performs fault management for the fault of the controlled device.

For example, if a serious defect occurs in the controlled device, and the fault information analysis unit in the fault management device determines that the serious defect is at a level that requires the fault management device to quickly enter the safe mode using the third counter, the fault management device may perform the same mechanism as performing the fault management by determining the third counter performed in the present embodiment.

Hereinafter, a fault management device 1000 according to an embodiment of the present disclosure is described with reference to FIG. 12. For example, the fault management device 1000 is a device for managing faults of one or more controlled devices provided in a mobility device. The fault management device 1000 may be provided in the mobility device.

Figure 12:
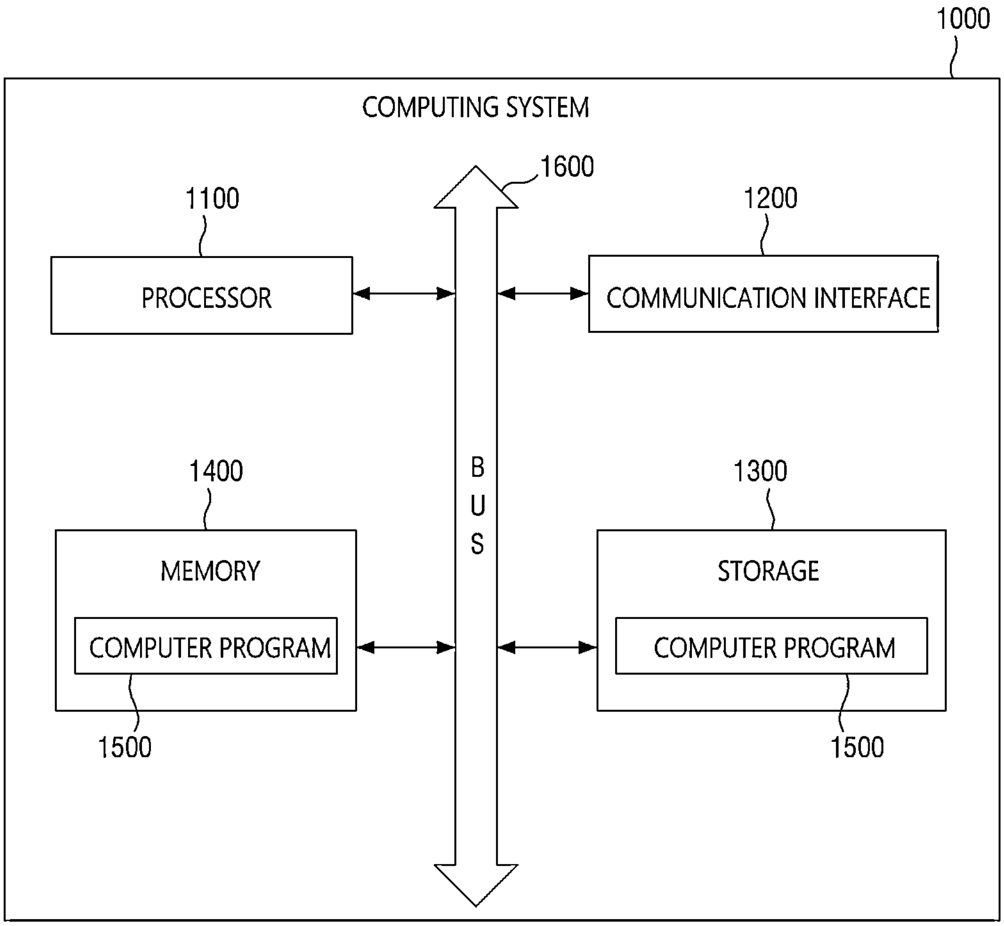
FIG. 12 is a hardware configuration view of a fault management device, according to an embodiment of the present disclosure.

FIG. 12 is a hardware configuration view of the fault management device 1000, according to an embodiment. The fault management device 1000 may include one or more processors 1100, a system bus 1600, a communication interface 1200, a memory 1400 for loading a computer program 1500 executed by the processor 1100, and a storage 1300 for storing the computer program 1500.

The processor 1100 performs calculations for controlling a controlled device (not illustrated) controlled by the fault management device 1000. The processor 1100 may include a memory management unit (not illustrated) that manages the memory 1400.

The processor 1100 controls the overall operation of each component of the fault management device 1000. The processor 1100 may perform a calculation on at least one application or program for executing the methods/operations according to various embodiments of the present disclosure. The memory 1400 stores various data, instructions, and/or information. The memory 1400 may load one or more programs 1500 from the storage 1300 to execute the methods/operations according to various embodiments of the present disclosure. The bus 1600 provides a communication function between the components of the fault management device 1000. The communication interface 1200 supports Internet communication of the fault management device 1000. The storage 1300 may non-temporarily store one or more computer programs 1500. The computer program 1500 may include one or more instructions in which the methods/operations according to various embodiments of the present disclosure are implemented. When the computer program 1500 is loaded into the memory 1400, the processor 1100 may perform the methods/operations according to various embodiments of the present disclosure by executing the one or more instructions.

The computer program 1500 may include instructions for receiving fault information from a controller connected to a fault management device, instructions for incrementing a first counter in response to receiving the fault information, instructions for incrementing a second counter and initializing the first counter when the first counter exceeds a first reference value, and instructions for incrementing a third counter and initializing the second counter when the second counter exceeds a second reference value.

The computer program 1500 may be implemented by applying technical ideas that may be understood through other embodiments described above.

The communication interface 1200 transmits and receives data with another control device (not illustrated) or a controlled device (not illustrated) in the vehicle. For example, the communication interface 1200 may be connected to a controller area Network (CAN)-based network or an Ethernet-based network.

Various embodiments of the present disclosure and the effects according to embodiments thereof are described above with reference to FIGS. 1-12. The effects according to the technical idea of the present disclosure are not limited to the forementioned effects. Other unmentioned effects may be clearly understood by those having ordinary skill in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained only when the operations are performed in the specific order or sequential order or when all of the operations must be performed. In certain situations, multitasking and parallel processing may be advantageous. According to the above-described embodiments, it should not be understood that the separation of various configurations is necessarily required. It should be understood that the described program components and systems may generally be integrated together into a single software product or be packaged into multiple software products.

Those having ordinary skill in the art should appreciate that many variations and modifications can be made to the embodiments without substantially departing from the principles of the present disclosure. Therefore, the disclosed embodiments of the present disclosure are used in a generic and descriptive sense only and not for purposes of limitation.

What is claimed is:

1. A method performed by a fault management device including a microcontroller, the method comprising:

receiving fault information from a controller connected to the fault management device;

incrementing a first counter in response to receiving the fault information of a controlled device of a mobility device;

incrementing a second counter and initializing the first counter, when the first counter exceeds a first reference value;

incrementing a third counter and initializing the second counter, when the second counter exceeds a second reference value; and entering a safe mode when the third counter exceeds a third reference value, wherein when the fault management device does not receive the fault information for a first reference time or more, the first counter decrements, and wherein the safe mode is a mode in which the mobility device operates with one or more functions, of the controlled device of the mobility device, deactivated.

2. The method of claim 1, wherein the first reference value and the second reference value are one of i) arbitrarily set by a user or ii) linked to the fault information and have individually fixed values in each counter.

3. The method of claim 1, wherein the first reference time is one of i) arbitrarily set by a user or ii) linked to the fault information and has a fixed value in the first counter.

4. A method performed by a fault management device including a microcontroller, the method comprising:

receiving information indicating an occurrence of a pre-designated first fault of a controlled device from a controller connected to the fault management device;

incrementing a respective first counter of a first counter set corresponding to the pre-designated first fault, the first counter set including a first number of counters;

receiving information indicating an occurrence of a pre-designated second fault from the controller connected to the fault management device; and incrementing a respective second counter of a second counter set corresponding to the pre-designated second fault, the second counter set including a second number of counters, wherein:

the first number and the second number are different, the first counter set and the second counter set each includes a respective set of one or more counters, when at least one of the first counter set or the second counter set includes a plurality of counters, i) the plurality of counters includes the respective first counter and the respective second counter, and ii) the respective second counter is incremented when the respective first counter exceeds a first reference value, and when at least one of the first counter set or the second counter set includes a respective third counter, i) the at least one of the first counter set or the second counter set including the respective third counter includes the respective first counter, the respective second counter, and the respective third counter, ii) the respective second counter is incremented when the respective first counter exceeds the first reference value, and iii) the respective third counter is incremented when the respective second counter exceeds a second reference value, and wherein the method further includes entering a safe mode when the respective third counter exceeds a third reference value, wherein the safe mode is a mode in which a mobility device operates with one or more functions, of the controlled device of the mobility device, deactivated.

5. The method of claim 4, further comprising decrementing the respective first counter when information indicating an occurrence of any one fault of a plurality of faults including the pre-designated first fault is not received for a first reference time or more.

6. A method performed by a fault management device including a microcontroller, the method comprising:

receiving information indicating an occurrence of a pre-designated first fault of a controlled device of a mobility device from a controller connected to the fault management device;

determining a counter to be incremented corresponding to the pre-designated first fault as any one of a first counter, a second counter, and a third counter; and incrementing the counter to be incremented, wherein the second counter is a counter that is incremented when the first counter exceeds a first reference value as a result of the increment of the first counter, wherein the third counter is a counter that is incremented when the second counter exceeds a second reference value as a result of the increment of the second counter, wherein incrementing the counter to be incremented includes entering a safe mode in response to the third counter exceeding a third threshold as a result of the increment of the counter to be incremented, and wherein the safe mode is a mode in which the mobility device operates with one or more functions, of the controlled device of the mobility device, deactivated.

7. The method of claim 6, further comprising:

receiving information indicating an occurrence of a pre-designated second fault from a controller connected to the fault management device;

incrementing the first counter in response to receiving the information indicating the occurrence of the pre-designated second fault;

incrementing the second counter and initializing the first counter, when the first counter exceeds the first reference value; and incrementing the third counter and initializing the second counter, when the second counter exceeds the second reference value, wherein the pre-designated first fault and the pre-designated second fault are different faults.

8. The method of claim 6, further comprising decrementing the first counter when information indicating an occurrence of any one fault of a plurality of faults including the pre-designated first fault is not received for a first reference time or more.

9. A fault management device, comprising:

a processor; and a memory for storing instructions, wherein the instructions, when executed by the processor, cause the processor to perform operations including:

receiving fault information of a controlled device of a mobility device from a controller connected to the fault management device;

incrementing a first counter in response to receiving the fault information;

incrementing a second counter and initializing the first counter, when the first counter exceeds a first reference value;

incrementing a third counter and initializing the second counter, when the second counter exceeds a second reference value; and entering a safe mode when the third counter exceeds a third reference value, wherein when the fault management device does not receive the fault information for a first reference time or more, the first counter decrements, and wherein the safe mode is a mode in which the mobility device operates with one or more functions, of the controlled device of the mobility device, deactivated.

10. The fault management device of claim 9, wherein the first reference value and the second reference value are one of i) arbitrarily set by a user or ii) linked to the fault information and have individually fixed values in each counter.

11. The fault management device of claim 9, wherein the first reference time is one of i) arbitrarily set by a user or ii) linked to the fault information and has a fixed value in the first counter.

* * * * *